United States Patent [19]

Cutler et al.

[11] 4,281,276

[45] Jul. 28, 1981

[54] DUAL MODE AC MOTOR DRIVE SYSTEM

[75] Inventors: John H. Cutler, Roanoke; Loren H. Walker, Salem, both of Va.

[73] Assignee: General Electric Company, Salem, Va.

[21] Appl. No.: 32,937

[22] Filed: Apr. 24, 1979

[51] Int. Cl.³ .......................... H02P 7/42; H02P 7/58
[52] U.S. Cl. .................................. 318/803; 318/807; 318/810
[58] Field of Search ............... 318/798, 799, 800, 801, 318/802, 803, 805, 807, 810, 811

[56] References Cited

U.S. PATENT DOCUMENTS

| | | | |
|---|---|---|---|
| 3,769,564 | 10/1973 | Rettig | 318/803 |
| 3,838,322 | 9/1974 | Greenwell | 318/810 |
| 3,983,463 | 9/1976 | Nabae et al. | 318/803 |
| 4,009,427 | 2/1977 | Takahashi | 318/803 X |
| 4,019,105 | 4/1977 | Cornell et al. | 318/803 |
| 4,088,934 | 5/1978 | D'Atre et al. | 318/808 X |
| 4,230,979 | 10/1980 | Espelage et al. | 318/721 |

FOREIGN PATENT DOCUMENTS 957014 10/1974 Canada ...................................... 318/803

Primary Examiner—S. J. Witkowski
Assistant Examiner—Richard M. Moose
Attorney, Agent, or Firm—A. E. Renner

[57] ABSTRACT

Disclosed is an AC motor drive system having a variable frequency, variable magnitude AC current supplied from a controlled inverter coupled to a variable DC current source in the form of a converter by way of a DC link including an inductor. The AC motor load is controlled so as to have dual modes of operation in order to optimize torque at any speed which can be produced within the voltage and current limitations of the variable frequency power source. The first mode comprises a constant slip or constant angle mode for operating speeds up to the corner point speed which is defined as the speed at which the motor voltage at full torque matches the maximum voltage the variable frequency inverter coupled thereto can provide. Thereafter, the system enters the second mode by automatically shifting to a constant horsepower variable slip or changing angle mode for operating speeds beyond the corner point speed.

18 Claims, 12 Drawing Figures

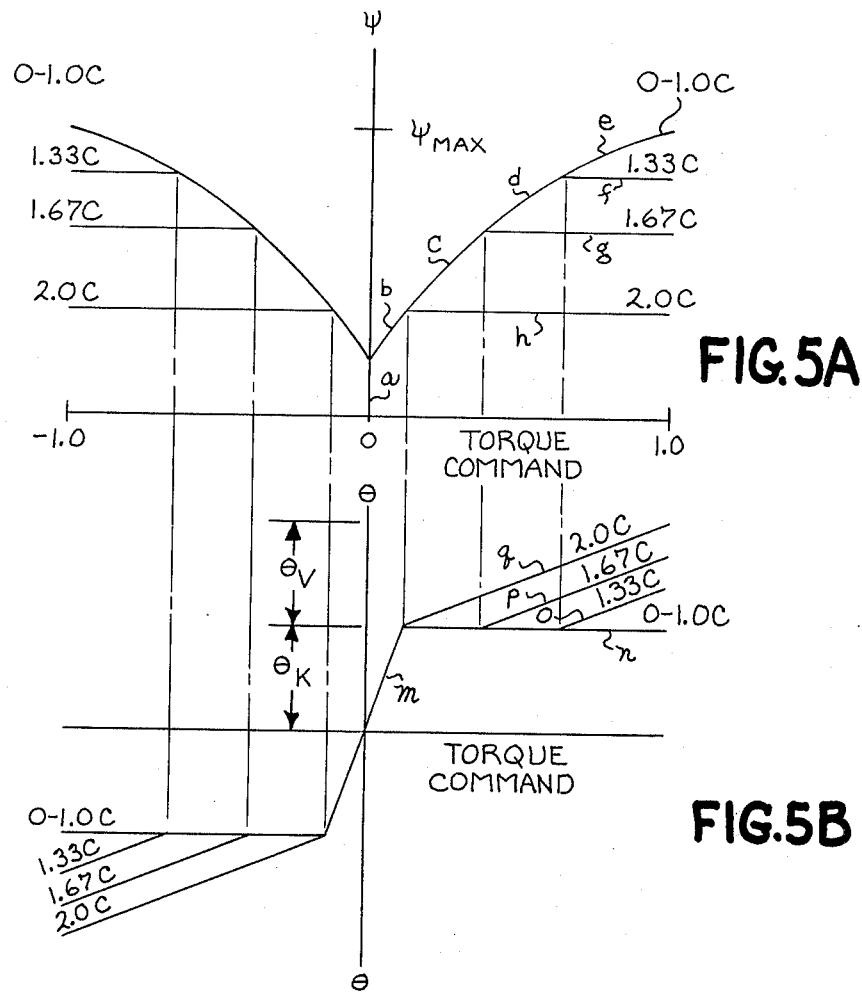
FIG.5A
FIG.5B
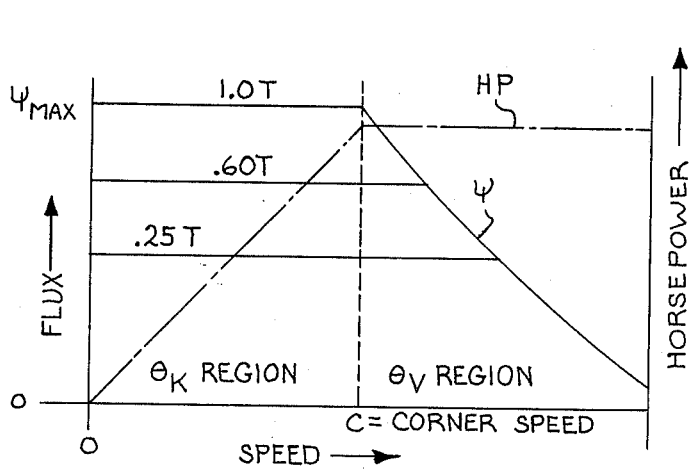
FIG.6

DUAL MODE AC MOTOR DRIVE SYSTEM

CROSS REFERENCE TO RELATED APPLICATION

The subject invention is related to U.S. Pat. No. 4,230,979 entitled, "Controlled Current Inverter and Motor Control System", issued Oct. 28, 1980 in the names of Paul M. Espelage, et al. which patent is also assigned to the assignee of this invention, now U.S. Pat. No. 4,230,979.

BACKGROUND OF THE INVENTION

The present invention relates generally to power conversion systems and more particularly to a system for controlling the torque of an AC motor load, not only in a substantially constant slip mode, but in a voltage limited mode with reduced flux beyond a predetermined speed.

In the past DC (direct current) motors have been used for operation over wide speed ranges. More recently, AC motors have been finding greater application in variable speed drive applications. This is due in a large part to the inherent ruggedness of an AC induction motor, for example, that which results in a reduced maintenance problem due to the lack of brushes which makes AC motors particularly desirable for certain applications. There are however, certain problems associated with the use of AC motors, particularly when the motor is supplied by power from a variable frequency inverter (DC to AC) which in turn is fed DC power from a converter (AC to DC).

Where, for example, the converter/inverter circuits are implemented by means of phase controlled thyristors connected in bridge circuit configurations, one must consider the commutation delay existing between the time current transfer is effected from a previously conducting thyristor to the newly fired thyristor. Normally this overlap is from 10 to 30 electrical degrees. In supplying an AC motor, such as an induction motor at high motor speed, it may take as long as 120 electrical degrees between the firing of a new thyristor and the transfer of the current to the motor phase to which the thyristor is connected. As such, the use of an open loop system in which thyristors are fired as a result of a preestablished schedule is not particularly applicable to the desired type of operation and instead a closed loop system in which the thyristors, for example, are fired as a function of the existing angle $\theta$ between the air gap flux and the motor current (commonly referred to as the air gap power factor) represents a more desirable mode of operation.

In the above referenced related U.S. Pat. No. 4,230,797, which is specifically incorporated herein by reference, there is disclosed a controlled current inverter system for supplying an AC load such as an induction motor with an AC current of variable magnitude and variable frequency. The system described therein employs a variable DC power source which is connected to a variable frequency converter preferably by way of a DC link including an inductor. Means are included to develop signals representing the instantaneous electrical torque T of the AC motor and the instantaneous air gap power factor. The electrical torque signal and the angle signal are utilized to control the DC current in the link and the firing angle of the inverter with respect to the motor flux such that the angle $\theta$ is controlled and maintained substantially constant over its prescribed operating range.

SUMMARY OF THE INVENTION

It is therefore an object of the present invention to provide an improved power conversion system, particularly as applied to the operation of an AC motor.

Another object is to provide an improved AC motor control and drive system which has an extended range of operation.

It is a further object to provide an improved motor control and drive system which can operate at constant horsepower beyond a certain speed.

These and other objects are accomplished through the provision of an AC motor drive system including an AC to DC converter and a DC to AC variable frequency inverter. Both the inverter and converter are controlled by means of a closed loop feedback system having a torque control signal controlling the converter and an angle $\theta$ reference signal controlling the inverter. The system includes means for maintaining the angle $\theta$ substantially constant over as much of the load and speed range as possible and thereafter automatically shifting to an operating mode wherein the angle $\theta$ reference signal is varied to provide a substantially constant horsepower output to maximize torque within the voltage and current limits available. This mode shift occurs when speeds higher than the corner point speed are desired. Corner point speed is defined as the speed at which the motor voltage at full torque matches the maximum voltage the variable frequency inverter can supply to the motor. In order to implement operation above corner point speed, a motor current signal is used as feedback in the torque control loop, the flux program generator is modified by a variable clamp whose level is a function of the motor speed. Additionally, the angle $\theta$ reference signal is modified to variably increase from a substantially constant magnitude at speeds higher than the corner point speed by the output from a constant horsepower angle bias circuit.

BRIEF DESCRIPTION OF THE DRAWING

While the present invention is particularly defined in the claims annexed to and forming a part of this specification, a better understanding can be had from the following description taken in conjunction with the accompanying drawings in which:

FIGS. 5A and 5B are characteristic curves illustrative of the operational characteristic achieved by the subject invention;

FIG. 6 is a graph further helpful in understanding the operation of the subject invention;

DETAILED DESCRIPTION

Figure 1:
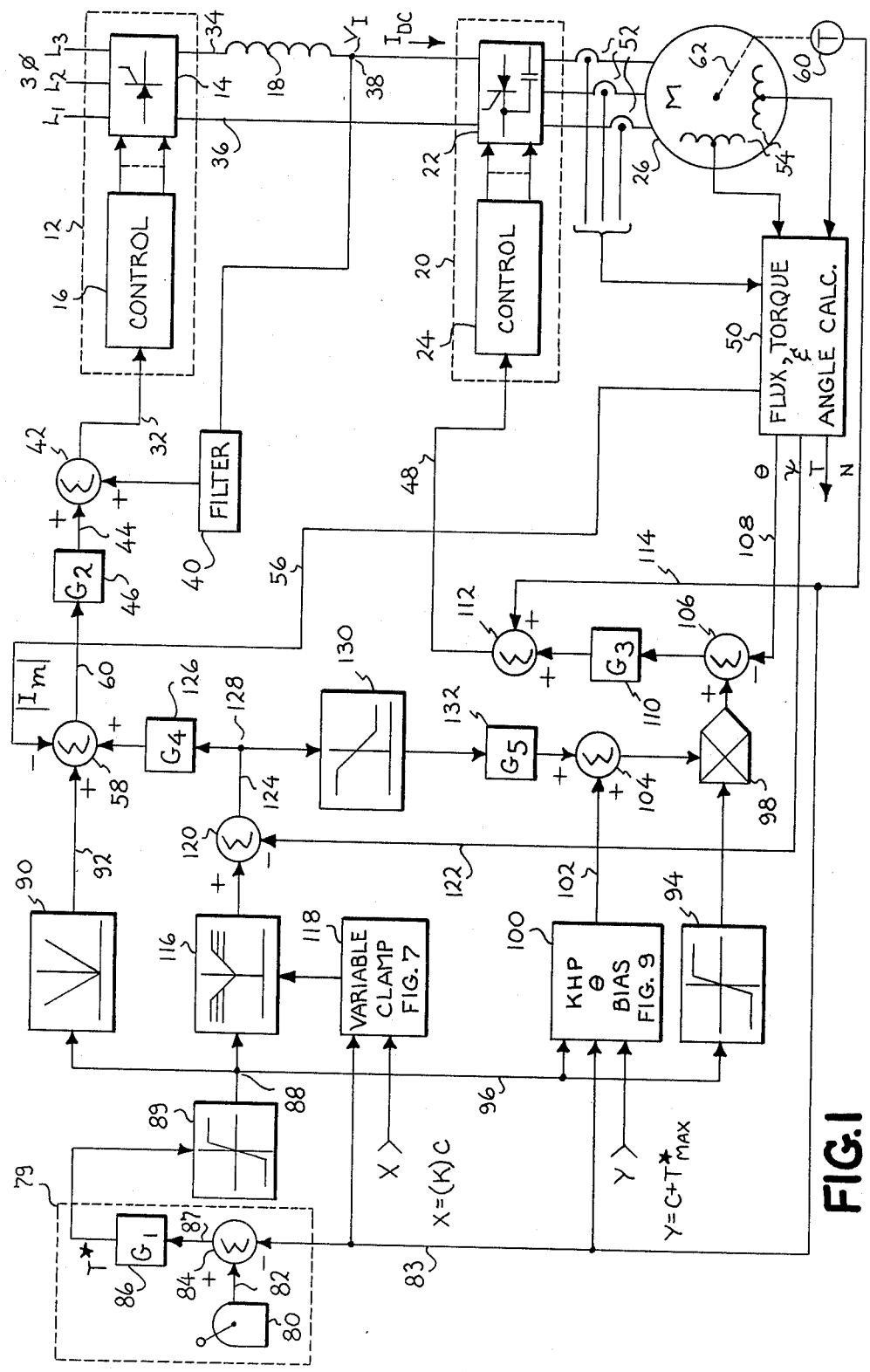
FIG. 1 is a schematic block diagram illustrating the present invention in its preferred embodiment.

Referring now to FIG. 1, there is shown what is at present considered to be the preferred embodiment of the subject invention. The system includes a source 12 of variable DC current consisting of an AC to DC converter unit 14 under the control of a suitable control means 16. A current ($I_{DC}$) is supplied from source 12 by way of a DC link circuit, including, for example, an inductor 18 which serves to smooth the DC current from the source. The inductor is coupled to a variable frequency AC source comprised of a DC to AC inverter circuit 22 under the control of a control means 24. The output of the inverter circuit is supplied to a load shown in FIG. 1 as a motor 26.

The DC source 12 in its preferred form is a phase controlled multi-leg bridge, for example a six thyristor bridge, which has its input connected to a three phase ($3\phi$) AC source connected to the lines $L_1$, $L_2$ and $L_3$. The control unit 16 can be of that known type which is synchronized with the line voltage and which under the control of an input signal applied to the signal lead 32 varies the DC voltage appearing across lines 34 and 36.

A feedback path from the inverter input voltage $V_I$ appearing at circuit node 38, is coupled to the DC source 12 by way of a filter 40 and a summing junction 42. The signal appearing on circuit lead 32 is a positive feedback of unity gain. Ignoring for the moment any other inputs to the summing junction 42, this feedback will cause the output voltage of the converter 14 to match that reflected by the inverter 22, namely, $V_I$. With no DC voltage across the inductor 18, the inductor will tend to maintain a constant current at any voltage level set by $V_I$. If a second signal is injected into the summing junction 42, however, such as by way of an input lead 44, the result will be a change in the voltage across the inductor 18 which is proportional to this second signal. This then will cause a rate of change of current $I_{DC}$ in inductor 18 which is proportional to the signal at the input lead 44. Thus, the positive feedback signal through filter 40 has acted to convert the DC voltage source 14 into a DC current source responsive to an input signal appearing at the input 44 which, as shown in FIG. 1, constitutes the output of an amplifier 46 which will be subsequently described.

The inverter circuit 22 is also preferably comprised of a six thyristor bridge inverter already referred to above and includes the necessary diodes and capacitors to provide for forced commutation. The operating frequency of the inverter 22, as noted, is under the control of the means 24, a well known implementation being a voltage controlled oscillator feeding a ring counter, the output signals of which are used to initiate the firing of the thyristors of the bridge. In this type of control, the magnitude of the input signal appearing on circuit lead 48 is adapted to control the inverter output frequency.

Figure 2:
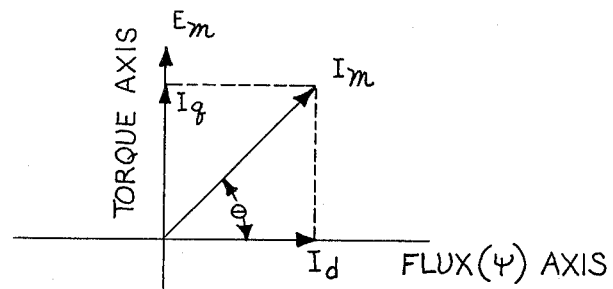
FIG. 2 is a diagram helpful in understanding the operation of the subject invention.

The motor 26 is an AC motor and preferably an AC induction motor. As is well known, the instantaneous air gap power factor angle $\theta$ of the motor, which is defined as the angle between the motor flux generated by a current $I_d$ and the motor current $I_m$ as shown in FIG. 2, can be varied by changing the inverter output frequency since any difference between the frequency of motor back EMF and the frequency of inverter current will appear as a rate of change of phase angle of current with respect to flux.

In the overall control of the present invention, four signals find primary application. These signals are: one which is proportional to the air gap flux $\psi$, the angle $\theta$, the absolute value of the motor current $I_m$, and the actual motor speed N. The three signals $\psi$, $\theta$ and $I_m$ are derived by suitable calculations in response to motor operating parameters and are shown emanating from a block designated by reference numeral 50 in FIG. 1. The exact circuitry of the means 50 may be, for example, that which is shown and described in U.S. Pat. No. 4,088,934, which issued on May 9, 1978 in the names of J. T. D'Atre, A. B. Plunkett and T. A. Lipo, entitled "Means for Stabilizing AC and Electric Motor Drive System", which invention is assigned to the assignee of the present invention, and which is specifically incorporated herein by reference.

In accordance with U.S. Pat. No. 4,088,934, means 50 develops not only the signals $\psi$ and $\theta$, but also a signal representative of torque T. A signal representative of motor current $I_m$ is further developed from three current sensors 52, associated with the lines connecting the inverter 22 to the motor 26 and is applied to the block 50. Signals proportional to motor flux are derived from a pair of flux coils 54 associated with the motor. As illustrated in FIG. 1, in addition to the $\psi$, T and $\theta$ signals, circuit block 50 outputs a signal $|I_M|$ which is a signal proportional to the absolute value of the motor current $I_m$. This signal represents the absolute value of the rectified and combined individual values of the signals derived from three current sensors 52. This signal is coupled by means of signal lead 56 to a summing junction 58, about which more will be said subsequently.

A tachometer 60 is shown mechanically coupled to the motor 26 as indicated by the dashed line 62 and serves as a means of providing a signal parameter N of motor speed. Tachometer 60 can be of any well known type of device which will provide a steady state output voltage signal proportional to the actual speed of the motor.

As in the above-referenced related U.S. Pat. No. 4,230,979, there is presently disclosed a system which develops signals representing the desired instantaneous electrical torque of the AC motor and the desired instantaneous angle $\theta$ between the gap flux and the motor current. Through the establishment of a torque reference signal, appropriate error signals are generated, the first serving to control the DC current in the link and the second to control the firing angle of the inverter with respect to the motor flux such that the air gap power factor at the motor is controlled. In the subject invention, signals derived from torque and angle error signals are applied to command leads 32 and 48, respectively. The subject invention departs from the system described in U.S. Pat. No. 4,230,979 in several respects, primarily in the manner in which the air gap power factor angle $\theta$ and flux $\psi$ is controlled. This can be demonstrated by reference to FIGS. 4 through 6.

Figure 3A:
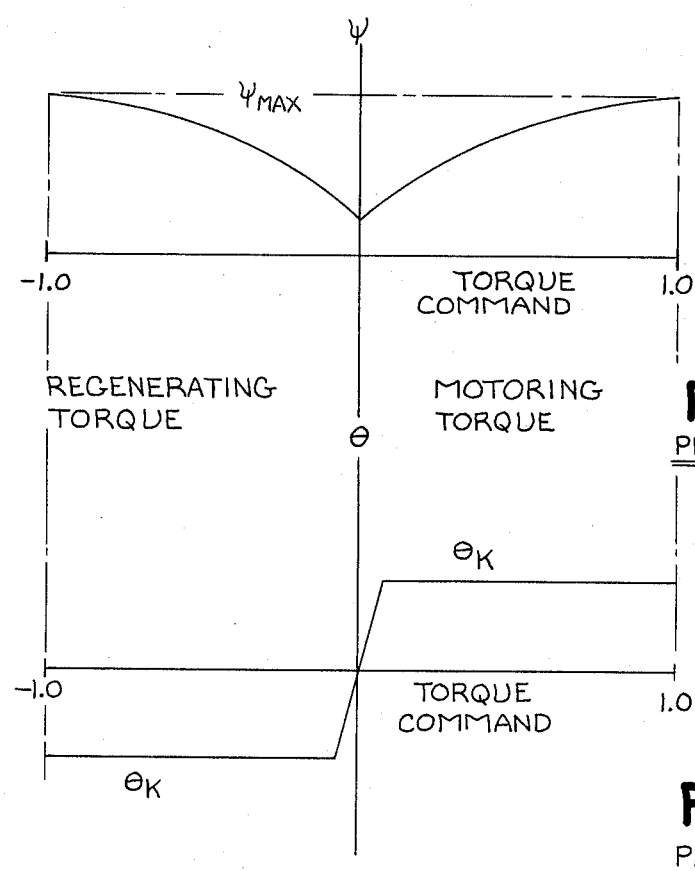
FIGS. 3A and 3B are characteristic curves illustrative of the operating characteristic of a prior art system.
Figure 3B:

In the system as disclosed in U.S. Pat. No. 4,230,979, a constant angle $\theta$ as shown in FIG. 2 is maintained throughout the system's operating range except near zero torque. As such, the flux $\psi$ and angle $\theta$ characteristic was developed in the system as shown in FIGS. 3A and 3B. Such an operational characteristic, while being acceptable for certain operational motor speeds, exhibits an inherent limitation at other speeds.

Figure 4:
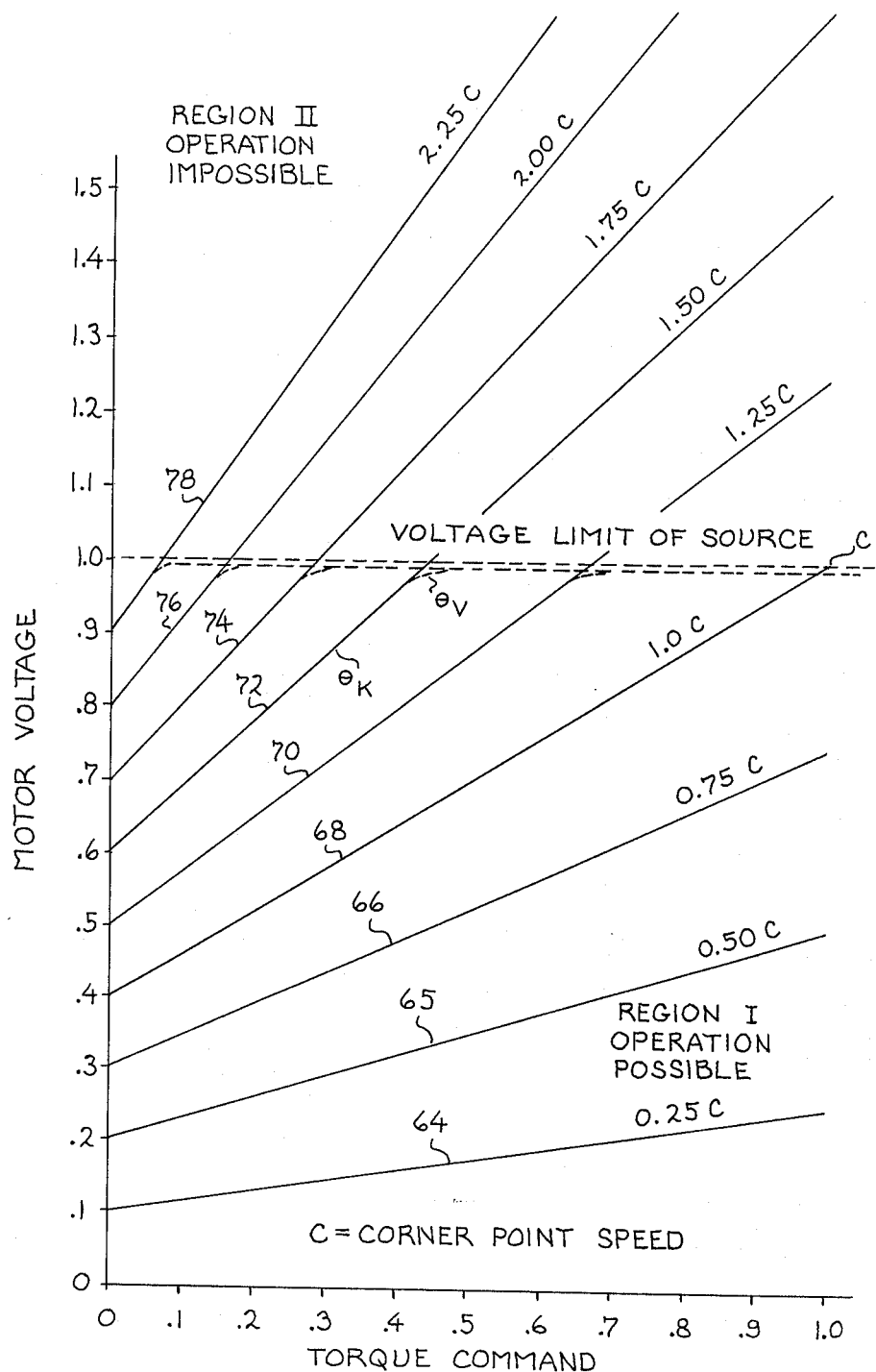
FIG. 4 is a graph helpful in understanding the operation of the subject invention.

Defining corner point speed C as the speed at which the motor voltage at full torque matches the maximum voltage limit of the variable frequency power source, reference now to FIG. 4 illustrates both prior art and the improved performance achieved by the subject invention. Region I denotes the region of possible system operation whereas Region II denotes a region where operation is not possible inasmuch as the ordinate value of 1.0 signifies the normalized maximum voltage of the source. The full lined curves shown in FIG. 4 represent a set of curves of constant angle $\theta_K$ for various constant speeds related to corner point speed C. For speeds in the range from 0 to 1.0C maximum torque indicated by the normalized value 1.0 can be delivered as indicated by curves 64, 65, 66, 68. For operation at speeds in excess of the corner speed curves 70, 72, 74, 76 and 78 indicate that the maximum torque deliverable is limited by the point where the respective constant angle $\theta_K$ curves intersect the normalized voltage limit of the source. Accordingly, in prior art type systems the deliverable output torque decreases rapidly as speed beyond the corner point C is exceeded. The present invention, however, is directed to a means of optimizing the deliverable torque for speeds in excess of the corner speed C by switching to a modified angle command mode at speeds higher than the corner point. Accordingly, a modification of flux and angle $\theta$ characteristics such as shown in FIGS. 5A and 5B is utilized.

Considering FIG. 5A, for example, curve segments b, c, d and e correspond to the flux program provided in the aforementioned prior art system. Such a program is desirable for operating speeds in the range of 0-1.0C speed; however, for speeds greater than 1.0C, the flux is clamped at predetermined lesser values than $\psi_{max}$. For example, where 1.33C speed is desired, a flux program consisting of flux curve segments b, c, d and f is implemented whereas for 2.0C operating speed, a flux curve is implemented consisting of segments b and h. The segments f and h indicate respective clamped levels.

Considering the angle $\theta$ characteristic as shown in FIG. 5B which should be considered concurrently with the flux program of FIG. 5A, it can be seen that curve segments m and n define a constant angle $\theta_K$ mode of operation for the speed range of 0-1.0C. This also corresponds to the curve shown in FIG. 3B. For speeds in excess of corner speed C, for example, at a speed of 1.33C, the angle program desired consists of curve segments m, n and o, whereas for operating speeds at 2.0C, the desired angle program consists of curve segments m and q. The segments o, p and q call for a variable angle $\theta_v$. The flux and angle programs characterized by the curves shown in FIGS. 5A and 5B are further adapted to provide motor operation of constant horsepower output beyond the corner speed C in a voltage limited mode at reduced flux, the latter being evident in view of FIG. 5A.

FIG. 6 shows that, in accord with the constant slip mode of operation ($\theta_K$) there is a specific value of flux associated with each value of torque when speed is below corner point. It further shows that for torque less than the maximum value this mode of operation can extend above corner point speed. The change in operation, to variable angle $\theta_v$ occurs at the speed at which the flux level associated with a given torque level in constant angle operation intercepts the maximum flux allowed for that speed.

Referring now back to FIG. 1, there is disclosed in block diagram form what is at present considered to be the preferred means for implementing the desired characteristics for operating a variable frequency AC motor drive which combines constant slip (constant angle) operation with constant horsepower variable slip (variable angle) operation with a takeover which is a function of both load and speed. The basic control function of the present invention begins with the establishment of a torque reference signal. In the implementation shown, the torque reference signal is generated by a speed regulator circuit 79. A speed command signal is established therein by means such as an operator settable rheostat 80 which will provide an output signal on circuit lead 82 which is proportional to a desired motor speed. The actual motor speed signal N from the tachometer 60 is combined with the speed reference signal by means of a summing junction 84 such that the output of the summing junction 84 will be a signal proportional to the difference between the desired and actual motor speed. This difference signal is applied to a suitable amplifier 86, via circuit lead 87, which has a transfer function $G_1$ appropriate for speed regulation. Customarily this transfer function is of an integration type such that, for example, it can be expressed by the equation:

$$G_1 = \frac{K(1 + tS)}{S}$$

where K is the constant, t is the time constant and S is the Laplace transform operator. The output of the amplifier 86 is a signal which is designated the torque reference signal T*, a signal proportional to the desired torque. The torque reference signal T* is fed to a fixed amplitude clamp circuit 89 which is operable to limit the torque command to the maximum torque for which the motor and power converter are designed. The maximum torque command is defined as $T^*_{max}$ which corresponds to a normalized torque command of 1.0.

As noted above, the purpose of the DC current source 12 is to provide a DC current $I_{DC}$ of varying magnitude in accordance with the desired torque and accordingly a torque control channel will be considered first. Since the invention contemplates motor operation in both the forward and reverse directions and since in either case the torque reference signal T* at circuit node 88 can be of either polarity, the torque reference signal T* is first applied to an absolute magnitude circuit 90. The output therefrom appears on circuit lead 92 and forms one input to the previously referenced summing junction 58 which also has applied thereto the absolute value $|I_m|$ of the motor current. Ignoring for the present the third input to the summing junction 58, the output appearing on circuit lead 60 is a signal proportional to the difference between the torque reference signal T* and the current $|I_m|$ and constitutes the current error signal which is fed to the summing junction 42 via the amplifier 46. As previously indicated, the feedback signal $V_I$ fed to the summing junction 42 by way of the filter 40 causes the current $I_{DC}$ to be controlled in accordance with the signal at the input of the summing junction 42 and accordingly which appears on circuit lead 34. Since torque increases as motor current is increased as can be seen by reference to FIG. 2, wherein the current $I_q$ which produces torque is shown to be equal to $I_m \sin \theta$, errors in torque will be corrected by the current error signal applied to the control circuit 16 via the summing junction 42 and circuit lead 32.

Next to be discussed is the signal channel for controlling the air gap power factor angle $\theta$ as it is used to control the frequency of the inverter 22 in both modes of operation.

Reference is now made to the lower left hand portion of FIG. 1 wherein reference numeral 94 designates a limiter circuit which substantially provides an output signal of constant magnitude but of varying polarity in accordance with the polarity of the torque reference signal T* coupled thereto from circuit node 88 via circuit lead 96. The limiter 94 provides an output consisting of an angle program signal corresponding to $\theta_K$ which is applied to a multiplier 98. This input corresponds to curve segments m and n shown in FIG. 5B. Additionally, a constant horsepower angle $\theta$ bias circuit 100 (FIG. 9) is also provided to vary the angle $\theta$ for operating speeds above the corner point C. This $\theta$ bias signal is adapted to implement the $\theta_v$ characteristic curve segments o, p and q shown in FIG. 5B. This output which appears on circuit lead 102 is coupled to multiplier 98 via circuit junction 104. Neglecting for the present the other input to the summing junction 104, it can be seen that the output of the multiplier circuit 98, an angle reference signal, comprises a composite signal corresponding to the characteristics shown in FIG. 5B. The angle bias circuit 100 receives three input signals, namely the torque reference signal T*, the motor speed signal N and a constant signal Y proportional to the sum of the corner speed signal C and maximum possible torque reference signal T*$_{max}$.

Returning now to the multiplier 98, its output is applied to one input of a summing junction 106 which has its other input coupled to the angle signal $\theta$ which appears on circuit lead 108 from the circuit block 50. Those two signals form a frequency error signal which is applied by means of a suitable amplifier 110 to another summing junction 112, which also has a second input coupled to the motor speed signal N via circuit lead 114. The output of the summing junction 112 comprises the frequency command signal which is applied to the control circuit 24 for controlling the frequency output of the converter circuit 22 as taught in U.S. Pat. No. 4,230,979.

It is to be noted with reference to the torque characteristic implemented by the aforementioned circuitry that if the torque reference signal T* is zero, the angle program signal from the $\theta_K$ program generator 94 and the constant horsepower angle bias circuit 100 will be zero. This constitutes the no load condition for the motor at which the power factor can only be zero, and therefore angle $\theta$ must be zero as well. From the foregoing then, the angle $\theta$ control loop is essentially a phase locked loop which senses an angle error to control the frequency and hence the air gap power factor of the motor.

Thus far it is seen that by controlling the motor current $I_m$ and the angle $\theta$ in accordance with a predetermined program, a precise control of both torque and flux in the motor is maintained. What should also be considered, however, is that this precise control can only be achieved if the motor characteristics are very constant, linear, and are accurately known such that the angle $\theta$ can be calculated very precisely. Since such a linear characteristic does not exist, the present invention also includes an additional parameter to the control functions, which parameter comprises the value of the motor flux $\psi$. This parameter is used to generate a low gain trim signal for modifying both the torque control and the frequency control signals to assure that the motor flux is at the proper value for each torque level.

Figure 7:
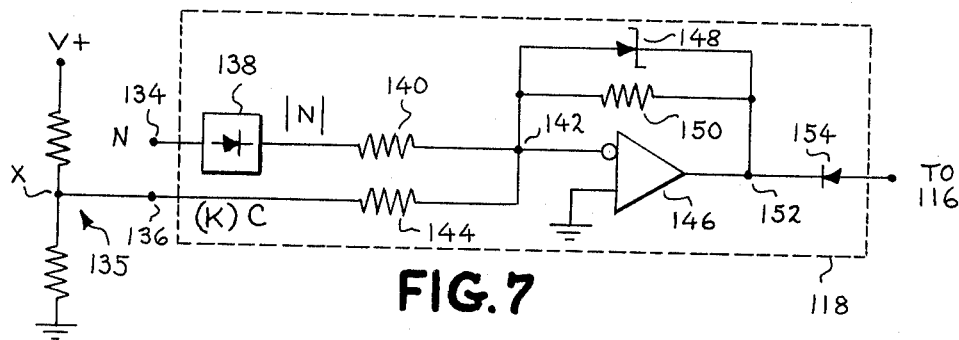
FIG. 7 is an electrical schematic diagram of a circuit for implementing a variable level flux clamp.

In order to gain a better understanding of the requirement of the third parameter, reference back to FIGS. 3A and 3B is in order. For example, in FIG. 3A, there is shown a parabolic characteristic for flux as a function of torque in constant angle $\theta_K$ operations; however, reference to FIG. 5A indicates that this parabolic characteristic is desirable only for operational speeds from 0 to 1.0C speed and that for speeds exceeding the corner speed C, the flux is limited to reduced constant values characterized by segments f, g and h shown in FIG. 5A. In the preferred embodiment shown in FIG. 1, the desired flux program is implemented by a flux program signal generator circuit 116, comprised of, for example, a simple magnitude limited absolute value circuit having an offset such that the output has some finite value even though the signal at circuit node 88 is zero. In addition, a variable clamp circuit 118 configured in accordance with the circuitry shown in FIG. 7, is coupled to the signal generator circuit 116. The variable clamp circuit 118 receives two inputs corresponding to motor speed N which appears on circuit lead 83 and a signal X corresponding to the corner speed C multiplied by a predetermined constant $\bar{K}$; i.e., (K)C. The variable clamp circuit 118 has the effect of implementing the segments f, g and h shown in FIG. 5A when applied to the signal generator circuit 116. The output of the flux program signal generator 116 which now comprises a flux reference signal is suppplied to one input of a summing junction 120. The other input is the $\psi$ signal from circuit block 50 applied thereto via circuit lead 122. The $\psi$ signal, as noted previously has a magnitude proportional to the instantaneous value of the motor gap flux. The output of the summing junction 120 comprises a flux error signal and appears on circuit lead 124. The flux error signal is applied to summing junction 58 in a positive sense by way of a suitable amplifier 126 which has its input coupled to circuit node 128. This positive addition to the torque control signal channel has the effect that if the instantaneous flux is less than that desired, the flux error signal coupled to summing junction 58 will cause an increase in current to be supplied to the inverter 22. Conversely, if the flux is higher than desired, a smaller current will be supplied to the inverter. The flux error signal appearing at circuit node 128 is also coupled to the summing junction 104 by means of a limiter circuit 130 and an amplifier 132 so that for a zero flux error signal, a unity value is applied to the summing junction 104. This connection causes the angle $\theta$ to be reduced when the actual flux is smaller than the flux program.

The overall effect of the circuitry shown in FIG. 1 is that one can operate past corner point speed at less than full torque without changing the angle $\theta$ until motor voltage reaches its limit; i.e., the flux reaches the clamp level. Beyond that speed and torque, additional operating range may be obtained by varying the angle $\theta$. This is accomplished automatically by the arrangement shown in FIG. 1. While constant angle control is retained whereby flux rises with load over as much of the load and speed range as possible a mode switch thereafter occurs to a modified variable angle control while maintaining a constant horsepower output. This is depicted by the graph shown in FIG. 6 which illustrates the motor performance characteristics for three values of torque command.

Figure 8:
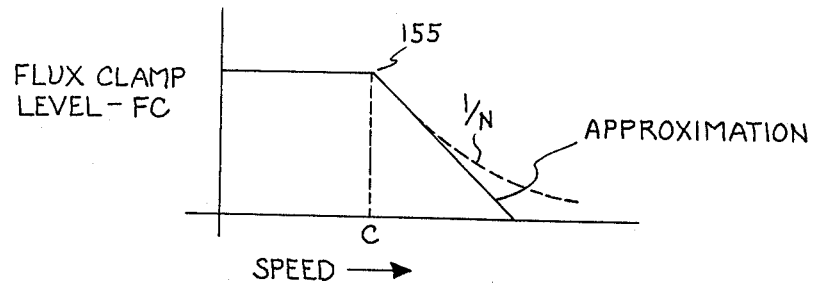
FIG. 8 is a diagram illustrative of the transfer function of the circuit shown in FIG. 7.

Referring now to FIG. 7, there is disclosed an illustrative embodiment of the flux clamp circuit 118 shown in FIG. 1. As shown, input terminals 134 and 136 have signals coupled thereto corresponding to the motor speed N and X (the corner point speed C multiplied by a predetermined constant K). The signal N is coupled thereto from tachometer 60 via circuit lead 83. Since the signal X is of a fixed magnitude, an analog signal thereof can be generated, for example, by a simple fixed voltage divider network 135 coupled across a voltage source V+. Input terminal 134 is coupled to a rectifier means 138 which provides an output corresponding to the absolute value of N; i.e., |N|. Coupled to the output of the rectifier means 138 is a fixed resistor 140 which is coupled to a circuit node 142 along with another fixed resistor 144 which is coupled back to the input terminal 136. Circuit node 142 is coupled to the inverting input of an operational amplifier 146 which has the parallel combination of a Zener diode 148 and a fixed resistor 150 coupled from the output node 152 back to the input node 142. An output coupling diode 154 is adapted to connect the circuit to the flux program function generator circuit 116 shown in FIG. 1. The circuitry as shown in FIG. 7 exhibits a transfer characteristic as shown in FIG. 8 wherein the break point 155 corresponds to the breakdown voltage of the Zener diode 148 and corresponds to the corner point speed value C of the system. The circuit is further operable such that the resistor 150 controls the slope of the output characteristic past the break point 155 and is ideally selected to provide a hyperbolic function 1/N. This hyperbola may be approximated by a straight line over a restricted region but for wide speed ranges a non-linear feedback element may be substituted for the resistor 150 to model the hyperbola. Accordingly, with the linear model of the hyperbola, the output level of the circuit 118 is constant up to the corner point speed value C, but thereafter falls with a constant slope approximating the ideal hyperbola, which as described above, has the effect of clamping the flux value $\psi$ to reduced values relative to $\psi_{max}$ as the speed is increased above corner point speed.

Figure 9:
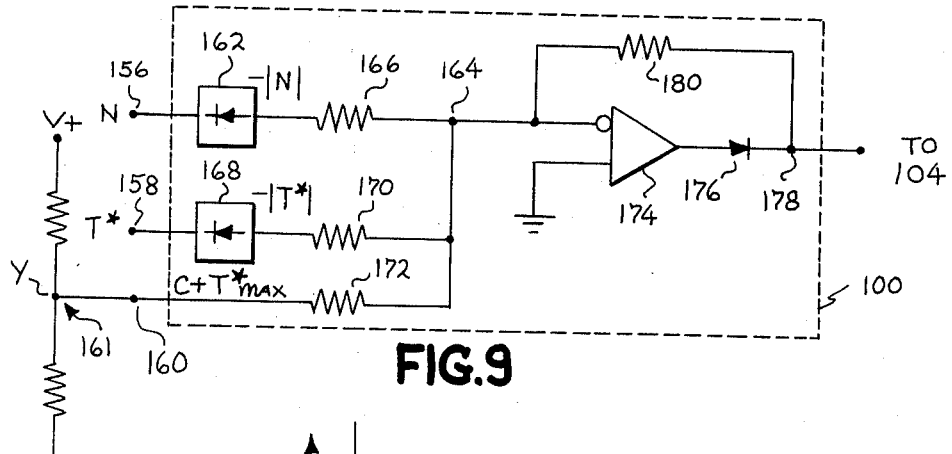
FIG. 9 is an electrical schematic diagram of a circuit providing a constant horsepower angle bias signal.
Figure 10:
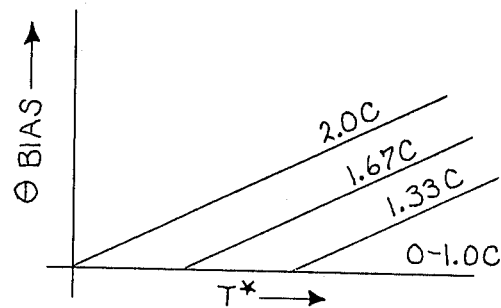
FIG. 10 is a diagram illustrative of the transfer function of the circuit shown in FIG. 9.

Referring now to FIG. 9, there is disclosed an illustrative embodiment of the constant horsepower angle $\theta$ bias circuit 100 shown in FIG. 1. Three input terminals 156, 158 and 160 are adapted to receive a motor speed signal N, the torque reference signal T* and a constant signal $Y = C + T^*_{max}$, respectively. An analog signal corresponding to the fixed value of Y can be obtained by means of a voltage divider network 161 coupled across the fixed voltage source V+. Input terminal 156 is connected to rectifier means 162 which is adapted to provide an output of the absolute value of motor speed with a negative sign; i.e., −|N| and is coupled to a circuit node 164 by means of a fixed resistor 166. The input terminal 158 is connected to rectifier means 168 which is adapted to provide an output of the absolute value of the torque reference signal also with a negative sign; i.e., −|T*|. This signal is also coupled to circuit node 164 by means of the fixed resistor 170. Finally, the input terminal 160 is coupled to a fixed resistor 172 which is also coupled to the circuit node 164. Circuit node 164 is coupled to the invention input of an operational amplifier whose output is coupled to a diode 176. The diode in turn is connected to circuit node 178 to which is connected a feedback resistor 180 having its opposite end connected back to the inverting input of the operational amplifier 174. The numerical values of the resistors 166, 170, 172 may be chosen to be equal thereby rendering a scaling such that $T^*_{max}$ is equal to C. The constant signal $Y = C + T^*_{max}$ is further selected such that the diode 176 conducts at speeds higher than corner point speed C for increased torque command and thus is adapted to implement transfer functions as shown in FIG. 10. The feedback resistor 180 determines the gain of the circuit and is selected in accordance with the motor parameters to command an angle $\theta$ which causes the flux at $T^*_{max}$ to be the same as the limit value set by the clamp circuit 118 at each speed.

Thus what has been shown and described is a means for programming, as a function of both torque and speed, optimized flux and angle commands which are applied to a closed loop control system in order to combine a constant slip mode of operation with a constant horsepower mode of operation and thereby deliver at any speed the maximum torque which can be produced within the voltage and current limitations of the power source.

While there has been shown and described what is at present considered to be the preferred embodiment of the present invention, modifications thereto will readily occur to those skilled in the art. It is not desired, therefore, that the invention be limited to specific arrangements shown and described, but it is intended to cover all such modifications and alterations which fall within the true spirit and scope of the invention as defined in the appended claims.

What is claimed is:

1. A system for providing control of an AC electric motor having a stator and a rotor spaced from the stator by a gap across which flux is produced in response to an electrical motor current of variable magnitude and frequency supplied from a controlled source, said control being a function of both torque command and motor speed, and comprising:
   (a) means to determine with respect to the motor the instantaneous motor current and the instantaneous angle between the gap flux and said motor current and to provide signals proportional thereto;
   (b) means to establish a torque reference signal proportional to a desired level of electrical torque;
   (c) means to compare said torque reference signal with said signal proportional to the motor current and to generate a first error signal representative of any differences therebetween, said first error signal being coupled to said controlled source to vary the magnitude of the motor current supplied from said source;
   (d) means responsive to motor speed and said torque reference signal to derive an angle reference signal representative of the desired angle between the gap flux and motor current for first and second operational modes, said first operational mode being at speeds less than a predetermined reference speed wherein said angle reference signal is of a substantially constant angle value, and said second operational mode being at speeds greater than said predetermined reference speed wherein said angle reference signal is of a variable angle value; and
   (e) means to compare said angle reference signal with said signal proportional to the instantaneous angle between the gap flux and the motor current to generate a second error signal representative of a difference therebetween, said second error signal being coupled to said controlled source to vary the frequency of the motor current supplied thereto from said source.

2. The system as defined by claim 1 and additionally including:
   (f) means to determine with respect to the motor the instantaneous gap flux and to provide a signal proportional thereto;
   (g) means responsive to said torque reference signal to produce an unclamped flux reference signal proportional to a desired gap flux during said first operational mode and to produce a clamped flux reference signal proportional to a desired gap flux during said second operational mode wherein the clamp level is a function of motor speed;

(h) means to compare both unclamped and clamped flux reference signals with said signal proportional to the instantaneous gap flux and to produce a flux error signal representative of any difference therebetween; and (i) means responsive to said flux error signal coupled to said means (e) for modifying and angle reference signal as a function of said flux error signal.

3. The invention as defined by claim 2 and additionally including:

(j) means responsive to said flux error signal coupled to said means (c) to modify the value of said torque reference signal as a function of said flux error signal.

4. The system as defined by claim 1 wherein said predetermined reference speed is the corner point speed of the motor.

5. The system as defined by claim 4 and additionally including:

(f) means to determine with respect to the motor the instantaneous gap flux to provide a signal proportional thereto:

(g) means responsive to said torque reference signal to produce an unclamped flux reference signal proportional to a desired gap flux during said first operational mode and a clamped flux reference signal proportional to a desired gap flux in said second operational mode and wherein said clamp level is a function of motor speed in excess of the corner point speed of said motor;

(h) means to compare both unclamped and clamped flux reference signals with said signal proportional to the instantaneous gap flux to produce a flux error signal representative of any difference therebetween; and (i) means responsive to said flux error signal coupled to said means (c) for modifying the value of said torque reference signal as a function of said flux error signal and, (j) means responsive to said flux error signal coupled to said means (e) for modifying the angle reference signal as a function of said flux error signal.

6. The system as defined by claim 5 wherein said means to generate said first and second error signals includes means being effective to vary the magnitude and frequency of the motor current for effecting constant horsepower operation during said second operational mode.

7. The system as defined by claim 4 wherein said means (d) comprises:

(i) constant angle program generator means coupled to said torque reference signal and being operable to generate a first angle reference signal;

(ii) means providing signals indicative of corner point speed and actual motor speed and means providing a constant signal proportional to the sum of the maximum possible torque reference signal and corner point speed signal;

(iii) angle bias circuit means coupled to said torque reference signal, said actual motor speed signal and said constant signal proportional to the sum of the magnitude of the maximum possible torque reference signal and corner point speed and being operable to generate a second type angle reference signal; and (iv) means for combining said angle reference signals to provide a composite signal which comrises said angle reference signal providing said first and second operational mode angle reference signal thereby.

8. The system as defined by claim 7 wherein said combining means (iv) comprises a multiplier circuit.

9. The system as defined by claim 7 wherein said constant angle program generator means (i) comprises a limiter circuit.

10. The system as defined by claim 7 wherein said angle bias circuit means (iii) comprises:

respective circuit means coupled to said actual motor speed signal and said torque reference signal for developing absolute value signals thereof;

a summing circuit coupled to said absolute magnitude value signals of said actual motor speed and torque reference signal and said constant signal proportional to the sum of the maximum possible torque reference signal and the corner point speed signal; and operational amplifier means having an input coupled to said summing circuit means, said operational amplifier having an output coupled to an output junction coupled to said comparator means (e), a diode coupled between the output of said operational amplifier and said output junction and a feedback resistor coupled between said output junction and the input of said operational amplifier.

11. The system as defined by claim 2 wherein said means (g) comprises:

(i) flux program signal generator means coupled to said torque reference signal and providing a signal output having a minimum output value of a substantially constant offset value from zero;

(ii) means providing a signal indicative of actual motor speed and means providing a signal proportional to said predetermined reference speed; and (iii) a variable clamp circuit coupled to said flux program signal generator means and being operable to clamp the magnitude of said signal output at selected levels in response to a signal applied thereto which corresponds to actual motor speed.

12. The system as defined by claim 11 wherein said variable clamp circuit (iii) comprises:

means coupled to said signal corresponding to actual motor speed for developing a signal corresponding to the absolute value of motor speed;

a summing circuit coupled to said signal corresponding to said absolute value of said actual motor speed and said signal which is proportional to said predetermined reference speed;

an operational amplifier having an input coupled to said summing circuit and being responsive to the summed signal provided thereby;

a Zener diode and an electrical resistance coupled in parallel between the output of said operational amplifier and the input thereof; and circuit means coupling the output of said operational amplifier to said flux program signal generator means.

13. The system as defined by claim 12 wherein said flux program generator means comprises a limiter circuit.

14. The system as defined by claim 1 wherein said controlled source comprises:

(a) a variable DC current source for providing a DC output current which varies in response to said first error signal;
(b) a source of variable frequency current for supplying current to said motor at a frequency which is a function of said second error signal; and
(c) link circuit means including an inductor for connecting said DC current source to said source of variable frequency current.

15. The system as defined by claim 14 wherein said source of variable frequency current comprises a force commutated thyristor bridge inverter.

16. A method of driving an AC motor from a controlled power source supplying a current of variable magnitude and frequency to said motor, comprising the steps of:
(a) determining with respect to the motor the instantaneous motor current and the instantaneous angle between the gap flux and the instantaneous motor current and providing signals proportional thereto;
(b) establishing a torque reference signal;
(c) comparing said torque reference signal with the signal proportional to the instantaneous motor current and generating therefrom a first error signal representative of the difference therebetween;
(d) applying said first error signal to said power source to vary the magnitude of the motor current;
(e) deriving angle reference signals of first and second types in response to actual motor speed and the torque reference signal, said first type angle reference signals being derived at speeds less than a predetermined reference speed and said second type angle reference signals being derived for speeds greater than said predetermined reference speed;
(f) comparing the derived one of said first and second type angle reference signals with the signal proportional to the instantaneous angle between the gap flux and the motor current and generating a second error signal representing any difference therebetween; and
(g) applying said second error signal to said controlled power source for varying the frequency of the motor current, said second error signal of said first type being adapted to provide a constant angle mode of operation and said second type of angle reference signal being operable to produce a variable angle mode of operation.

17. The method as defined by claim 16 and additionally including the steps of:
(h) determining with respect to the motor the instantaneous gap flux and providing a signal proportional thereto;
(i) producing a flux reference signal proportional to a desired gap flux, said flux reference signal having a first type characteristic for said first operational mode and a second type characteristic during said second operational mode;
(j) comparing said flux reference signal with said signal proportional to the instantaneous gap flux and producing therefrom a flux error signal representative of any difference therebetween; and
(k) modifying said first and second error signals relative to the magnitude of said flux error signal.

18. The method as defined by claim 17 wherein said step (i) of producing a flux reference signal includes the step of generating a flux vs. torque characteristic which is clamped at predetermined values for speeds above corner point speed of the motor, said corner point speed being defined as the speed at which the motor voltage at full torque matches the maximum power the variable frequency power source can supply.

* * * * *